United States Patent Office 2,829,156
Patented Apr. 1, 1958

2,829,156

α - HYDROPEROXYISOPROPYLBENZOIC ACIDS, THEIR SALTS AND ESTERS AND METHOD OF PREPARATION

Milton A. Taves, Wilmington, Del., assignor to Hercules Powder Company, Wilmington, Del., a corporation of Delaware No Drawing. Application December 28, 1953
Serial No. 400,791

14 Claims. (Cl. 260—476)

This invention relates to hydroperoxides and more particularly to hydroperoxides of isopropylbenzoic acid and the salts and esters thereof.

In accordance with the present invention, it has been found that hydroperoxides of isopropylbenzoic acid and the salts and esters thereof are produced by contacting the isopropylbenzoic acid or the salt or the ester with elementary oxygen in the liquid phase at a temperature in the range of about 50° to about 150° C. in the presence of an acid-neutralizing amount of an acid-neutralizing agent and in the presence of a free-radical forming catalyst.

In carrying out the process in accordance with this invention, the isopropylbenzoic acid or its salt or ester is made into a solution either in water or in a non-aqueous solvent and a sufficient amount of a neutralizing agent to neutralize the acid in the case of isopropylbenzoic acid and to neutralize any acids formed in the process is added. In the case of the ester, the oxidation process does not require a solvent. The solution is then heated to a temperature in the range of about 50° to about 150° C. and brought into intimate contact with elementary oxygen as, for example, with a dispersion of air. The oxidation is carried out until a sufficient amount of hydroperoxide is formed for use in subsequent reactions or for isolation. The hydroperoxide of isopropylbenzoic acid may be set free from its salt by the cautious addition of mineral or organic acids. The hydroperoxides may then be separated from unreacted isopropylbenzoic acid or its ester by any of various methods set forth hereinafter.

The following examples are illustrative of the process in accordance with this invention. In this specification all parts and percentages are by weight.

*Example 1*

To a solution of 28.3 parts sodium p-isopropylbenzoate in 120 parts distilled water containing 0.12 part sodium carbonate was added a dispersed stream of oxygen at the rate of 0.14 part per minute while heating the reaction mixture at 90° C. and stirring vigorously. In order to initiate the reaction, the mixture was exposed to ultra-violet radiation until the reaction mixture on analysis showed the presence of about 2% hydroperoxide. The reaction was continued in the absence of ultraviolet light for a period of 38 hours at which time the hydroperoxide analysis showed the presence of 44.5% hydroperoxide of sodium p-isopropylbenzoate. During the course of the entire reaction the pH of the solution remained constant at about 10.2.

In order to separate unreacted p-isopropylbenzoic acid from the hydroperoxide, the reaction mixture was carefully acidified with acetic acid to pH 5 and the precipitated cumic acid was removed by filtration. The filtrate was then further acidified with hydrochloric acid to pH 1.5 whereby the hydroperoxide of cumic acid was precipitated. The yield of hydroperoxide of cumic acid was 11.7 parts crude material of 84.6% purity. The crude material was shown to contain 4.3% p-acetylbenzoic acid, 5.5% cumic acid and 5.5% of α-hydroxy-p-isopropylbenzoic acid. Pure α-hydroperoxy-p-isopropylbenzoic acid was obtained by crystallization of the crude material from benzene. It was a white crystalline solid which melted at 155° C. It was further characterized as α-hydroperoxy-p-isopropylbenzoic acid by conversion to p-hydroxybenzoic acid by heating for 10 minutes in a 2% solution of sulfuric acid in acetone.

*Example 2*

Example 1 was repeated with m-isopropylbenzoic acid, the acid being dissolved in sufficient aqueous sodium carbonate solution to correspond to a 17% aqueous solution of sodium cumate having a pH of about 10.2. The reaction was continued for about 45 hours at which time the hydroperoxide content amounted to 40.5%. The resulting oxidation mixture was acidified to pH 5 and filtered to remove unchanged m-isopropylbenzoic acid and the filtrate was acidified to pH 1.5 to precipitate the hydroperoxide. The crude hydroperoxide was dissolved in acetone containing 2% sulfuric acid and the resulting solution was refluxed for one-half hour. Sufficient water was then added gradually to the acetone solution to cause precipitation of crude crystalline m-hydroxybenzoic acid which on further crystallization melted at about 199° to 200° C.

*Example 3*

Oxygen gas was bubbled through a charge of 448 parts ethyl p-isopropylbenzoate in which was suspended 2.2 parts finely pulverized calcium hydroxide at 90° C. While adding the oxygen at the rate of about 0.15 part per minute through a fritted glass plate and stirring the reaction mixture rapidly, the reaction mixture was exposed to ultraviolet light until the hydroperoxide content of about 2% hydroperoxide was formed. This required about 60 hours. The reaction was continued for 123 hours at which time the content of ethyl p-isopropylbenzoate hydroperoxide amounted to 32.2%. During the course of the reaction the lime was gradually neutralized by the production of acids formed in the course of the reaction. Ethyl p-isopropylbenzoate was separated from the reaction mixture by distillation from the carefully neutralized product under reduced pressure. The ethyl p-isopropylbenzoate hydroperoxide in the residue was further purified by crystallization from benzene.

*Example 4*

Example 3 was repeated with carefully purified methyl m-isopropylbenzoate with substantially similar results. The crude reaction mixture containing unreacted methyl m-isopropylbenzoate and the hydroperoxide thereof was characterized by cleavage to methyl m-hydroxybenzoate by heating for one-half hour with a 2% acetone solution of sulfuric acid. The methyl m-hydroxybenzoate was purified by distillation of the carefully neutralized cleavage mixture. The methyl m-hydroxybenzoate boiled at 280° C.

The process of this invention produces hydroperoxides of isopropylbenzoic acids wherein the hydroperoxide group is on the tertiary carbon of the isopropyl group, namely, the α-carbon (Chemical Abstracts' system of nomenclature). The ease of oxidation varies with the different isomers and is most rapid in the case of the p-isopropylbenzoic acid, its salts and esters. For practical purposes the reaction is preferably carried out on the m- and p-isomers, the o-isomer being slow to oxidize.

While the oxidation may be carried out on solid reagents, it is preferably carried out on reagents in the liquid state. Thus, while the salt may be oxidized in suspension, it is preferably oxidized in solution. Salts of the alkali metals are preferably oxidized in aqueous solution and salts of alkali earth metals may be oxidized in organic solvents such as benzene. The esters may be oxidized in the presence or absence of organic solvents or in aqueous emulsions.

The temperature of the oxidation reaction is in the range of about 50° to about 150° C. and is preferably in the range of about 90° to about 115° C. The higher the temperature the more rapid the oxidation. However, the lower temperatures are preferably used in the case of the ester where there is a possibility of hydrolysis of the ester and it is desired to produce an ester as the end product. It is particularly important to use the lower temperatures in the case of the esters when water, which might cause hydrolysis, is present.

The elementary oxygen for the process of this invention is gaseous oxygen and it may be used in the pure state or diluted with inert gas such as nitrogen or air. In practical operations air or air fortified with oxygen is particularly satisfactory. The oxidation may be carried out at atmospheric, subatmospheric and superatmospheric pressure. Superatmospheric pressure is particularly desirable in those cases where the oxidation temperature is above the boiling point of the solvent used in the system.

In order to prevent breakdown of the hydroperoxides the oxidation system is maintained neutral or slightly alkaline. To this end a neutralizing amount of a neutralizing agent is used. The neutralizing agent is a hydroxide or an alkaline-acting salt of an alkali or an alkaline earth metal. Examples are: sodium hydroxide, potassium hydroxide, calcium hydroxide, barium hydroxide, sodium and potassium carbonates and bicarbonates, calcium carbonate, sodium acetate and potassium acetate. The amount of neutralizing agent needed for the reaction is just an amount sufficient to prevent accumulation of acidity in the system. In the case of aqueous solutions, the necessary amount of neutralizing agent is shown by a pH slightly on the alkaline side, for example, in the range of 7.5–12. In oxidizing isopropylbenzoic acid, the neutralization converts the acid substantially completely to the salt. Thus, in the case of acid-free alkali and alkali earth metal salts of isopropylbenzoic acid, the salt acts as the neutralizing agent and another neutralizing agent is unnecessary since in this case a neutralizing amount of neutralizing agent is present.

The oxidation is initiated by free-radical forming catalysts and is maintained by free radicals developed from the hydroperoxides in the system. Free-radical forming catalysts which are used in the process include ultraviolet light and organic and inorganic peroxides and hydroperoxides. It is preferable to use as a catalyst some of the hydroperoxide from a previous run corresponding to the hydroperoxide being oxidized. However, the process does not exclude the possibility of using other well-known peroxides or hydroperoxides as free-radical forming catalysts.

By the process of this invention hydroperoxides of isopropylbenzoic acids and salts and esters thereof have been produced for the first time. These hydroperoxides are of importance as intermediates in organic syntheses. For example, they may be heated with mineral acids to form the corresponding p-hydroxybenzoic acid or esters thereof and the hydroperoxides may be chemically reduced to the corresponding tertiary alcohols which in turn may be dehydrated to the corresponding isopropenylbenzoic acid or esters. The hydroperoxides of isopropylbenzoic acids and esters are also useful as polymerization catalysts and as bactericides.

What I claim and desire to protect by Letters Patent is:

1. As a new composition of matter a hydroperoxide of a material of the group consisting of m- and p-isopropylbenzoic acids and the salts and esters thereof.
2. As a new composition of matter α-hydroperoxy-m-isopropylbenzoic acid.
3. As a new composition of matter α-hydroperoxy-p-isopropylbenzoic acid.
4. As a new composition of matter a salt of α-hydroperoxy-m-isopropylbenzoic acid.
5. As a new composition of matter a salt of α-hydroperoxy-p-isopropylbenzoic acid.
6. As a new composition of matter an ester of α-hydroperoxy-m-isopropylbenzoic acid.
7. As a new composition of matter an ester of α-hydroperoxy-p-isopropylbenzoic acid.
8. As a new composition of matter ethyl α-hydroperoxy-p-isopropylbenzoate.
9. The method for the production of a hydroperoxide of a material of the group consisting of salts and esters of m- and p-isopropylbenzoic acids which comprises contacting said material in the liquid phase with elementary gaseous oxygen at a temperature in the range of about 50° to about 150° C. in the presence of an acid-neutralizing amount of a neutralizing agent of the group conisisting of hydroxides and alkaline-acting salts of alkali and alkali earth metals and in the presence of a free-radical forming catalyst.
10. The method for the production of a hydroperoxide of an isopropylbenzoic acid salt of the group consisting of m- and p-isomers thereof which comprises contacting an isopropylbenzoic acid salt in the liquid phase with elementary gaseous oxygen at a temperature in the range of about 50° to about 150° C. in the presence of an acid-neutralizing amount of neutralizing agent of the group consisting of hydroxides and alkaline-acting salts of alkali and alkali earth metals and in the presence of a free-radical forming catalyst.
11. The method for the production of a hydroperoxide of sodium p-isopropylbenzoate which comprises contacting sodium p-isopropylbenzoate with elementary oxygen in the liquid phase at a temperature in the range of about 50° to about 150° C. in the presence of an acid-neutralizing amount of a neutralizing agent of the group consisting of hydroxides and alkaline-acting salts of alkali and alkali earth metals and in the presence of a free-radical forming catalyst.
12. The method for the production of a hydroperoxide of an isopropylbenzoic ester of the group consisting of m- and p-isomers thereof which comprises contacting an isopropylbenzoic ester with elementary oxygen in the liquid phase at a temperature in the range of about 50° to about 150° C. in the presence of an acid-neutralizing amount of a neutralizing agent of the group consisting of hydroxides and alkaline-acting salts of alkali and alkali earth metals and in the presence of a free-radical forming catalyst.
13. The method for the production of a hydroperoxide of ethyl p-isopropylbenzoate which comprises contacting ethyl p-isopropylbenzoate in the liquid phase with elementary gaseous oxygen at a temperature in the range of about 50° to about 150° C. in the presence of an acid-neutralizing amount of a neutralizing agent of the group consisting of hydroxides and alkaline-acting salts of alkali and alkali earth metals and in the presence of a free-radical forming catalyst.
14. The method for the production of a hydroperoxide of the sodium salt of p-isopropylbenzoic acid which comprises contacting the sodium salt of p-isopropylbenzoic acid in aqueous solution of pH 7.5–12 with elementary gaseous oxygen at a temperature in the range of about 50° to about 150° C. and in the presence of a free-radical forming catalyst.

(References on following page)

References Cited in the file of this patent

UNITED STATES PATENTS

| | | |
|---|---|---|
| 2,613,227 | Joris | Oct. 7, 1952 |
| 2,632,774 | Conner et al. | Mar. 24, 1953 |
| 2,653,165 | Levine | Sept. 22, 1953 |
| 2,656,343 | Ritchie | Oct. 20, 1953 |
| 2,744,102 | Sublusrey | May 1, 1956 |
| 2,782,219 | Cleaver | Feb. 19, 1957 |

OTHER REFERENCES

Ciamician et al.: Ber. Deut. Chem. 45, 38 to 43 (1912).

Hock et al.: Ber., 77, 261 (1944).

Kharasch et al.: J. Org. Chem., 15, 765–6 (1950).